United States Patent [19]

Palmer et al.

[11] Patent Number: 4,509,144
[45] Date of Patent: Apr. 2, 1985

[54] PROGRAMMABLE BIDIRECTIONAL SHIFTER

[75] Inventors: John Palmer, Hillsboro, Oreg.; Bruce Ravenel, Sunnyvale, Calif.; Rafi Nave, Kiriat Motzkia, Israel

[73] Assignee: Intel Corporation, Santa Clara, Calif.

[21] Appl. No.: 558,171

[22] Filed: Dec. 5, 1983

Related U.S. Application Data

[60] Continuation of Ser. No. 341,862, Jan. 22, 1982, abandoned, which is a division of Ser. No. 129,995, Feb. 13, 1980, Pat. No. 4,338,675.

[51] Int. Cl.$^3$ .......................... G06F 1/00; G11C 19/00
[52] U.S. Cl. ........................................ 364/900; 364/715
[58] Field of Search ... 364/200 MS File, 900 MS File, 364/715

[56] References Cited

U.S. PATENT DOCUMENTS

| | | | |
|---|---|---|---|
| 3,781,819 | 12/1973 | Geng et al. | 364/900 |
| 3,928,857 | 12/1975 | Carter et al. | 364/200 |
| 3,961,750 | 6/1976 | Dao | 364/715 X |
| 4,023,023 | 5/1977 | Bourrez et al. | 364/200 X |
| 4,122,534 | 10/1978 | Cesaratto | 364/900 |
| 4,149,263 | 4/1979 | Prioste | 364/900 |

*Primary Examiner*—Jerry Smith
*Assistant Examiner*—Gary V. Harkcom
*Attorney, Agent, or Firm*—Blakely, Sokoloff, Taylor & Zafman

[57] ABSTRACT

A programmable bidirectional shifter is disclosed comprised of a first bidirectional load and read interface circuit selectively activated for left shifts, and a similarly constituted second bidirectional load and interface circuit which is selectively activated for right shifts. The first interface circuit is coupled to a byte shift matrix while the second interface circuit is coupled to a bit shift matrix. The byte shift matrix is arranged and configured to shift the input quantity by a multiple of bytes, namely multiples of eight bits. The bit shift matrix is similarly constituted to shift its input quantity by a selected number of bit locations up to seven consecutive places. The bit and byte shift matrices are coupled to allow bidirectional flow of signals therebetween. The bit and byte matrix are controlled by a bit and byte shift control circuit respectively which determines the number of bytes and bit places each matrix will actually shift.

1 Claim, 9 Drawing Figures

PROGRAMMABLE BIDIRECTIONAL SHIFTER

This is a continuation of application Ser. No. 341,862, filed Jan. 22, 1982, abandoned, which is a division of Ser. No. 129,995, Feb. 13, 1980, now U.S. Pat. No. 4,338,675.

BACKGROUND OF THE INVENTION:

1. Field of the Invention

The present invention relates to the field of numeric data processors and in particular, relates to integrated circuit, floating point numerical processors capable of mixed precision calculations, mixed mode arithmetic calculations and rounding operations.

2. Description of the Prior Art

Prior art arithmetic processors, particularly integrated circuit processors, are characterized by various artifacts of inaccuracy, unreliability and lack of safety during floating point calculations. For example, a typical prior art, integrated circuit process is capable of performing transcendental mathematical operations, including square root, in such a manner that the result is not only obtained relatively slowly, often only with software assistance, but subject to the possibility of multiple rounding errors in intermediate results leading to an inaccurate final answer and with no internal mechanism within the processor to either or correct the rounding errors. In addition, prior art processors generally cannot operate with mixed mode operands or can do so only with the substantial risk of producing erroneous results.

What is needed then is an arithmetic processor having sufficient internal precision to make quick, accurate and reliable calculations of single and double precision integers and floating point quantities with internal means to deal with rounding errors and other arithmetic exceptions or special cases such as zero and infinity arithmetic.

BRIEF SUMMARY OF THE INVENTION

The present invention includes a programmable bidirectional shifter which is comprised of a first bidirectional load and read interface circuit selectively activated for left shifts, and a similarly constituted second bidirectional load and interface circuit which is selectively activated for right shifts. The first interface circuit is coupled to a byte shift matrix while the second interface circuit is coupled to a bit shift matrix. The byte shift matrix is arranged and configured to shift the input quantity by a multiple of bytes, namely multiples of eight bits. The bit shift matrix is similarly constituted to shift its input quantity by a selected number of bit locations up to seven consecutive places. The bit and byte shift matrices are coupled to allow bidirectional flow of signals therebetween. The bit and byte matrix are controlled by a bit and byte shift control circuit respectively which determines the number of bytes and bit places each matrix will actually shift. By reason of this combination of elements, a numeric quantity of virtually arbitrary length may be selectively shifted by an arbitrary number of bit places during a single clock cycle and by the use of simple circuitry.

BRIEF DESCRIPTION OF THE DRAWINGS:

FIGS. 8$a$ and 8$b$ is a detailed block diagram illustrating the entire floating point execution unit of the present invention.

DETAILED DESCRIPTION OF THE PREFERRED EMBODIMENT

I. General Discussion of Data and Numeric Representations

In order to understand the methodology and apparatus of the present invention, consider first the basic representational formats for numerical data which the numeric processors must accommodate. According to the present invention, the data structure consists of five general data types: real long and short; integer long and short; and BCD integer.

Additionally, there are a number of special numbers which must be handled as exceptions. Plus and minus zero form a special class as a result of their special nature in arithmetic operations. Similarly, plus and minus infinity are used to represent positive and negative numbers with a magnitude greater than that of the largest representable number. A normalized number is defined as a real number having all significant bits in the fraction or significand. Denormalized numbers are those numbers which have an exponent equal to that of the smallest representable normalized number, but which have significands which are allowed to have leading zeros. Finally, when no numeric result can be represented, such as in the case of division of zero by zero, a "not a number (NAN)" or "IND" can be provided. Thus, underflow and overflow, rather than aborting the numerical operation when occurring, can be dealt with by the use of plus and minus infinity, denormalized numbers and NANs.

In the following description let P equals the sign bit; E equals the exponents; S the significand or fractions; and X the general numeric variable.

Consider first the specific definition of normalized numbers in both short and long word storage formats, i.e., in the format suitable for memory storage. The range of the number $2^{-1022} \leq x \leq (2-3^{-52})\,2^{1023}$ and is characterized by a biased eleven bit exponent, E, which is $1 \leq E \leq 2046$, which has a leading implicit one bit in a significant followed by 52 expressly specified bits. Thus, the interpretation of the long or double precision normalized number is $x = (-1)^P 2^{E-1023}("1" + S\,2^{-52})$ where "1" is an implicit one.

By the same token, the definition of a short word or single precision normalized number in memory is $$X=(-1)^P 2^{E-127}("1"+S2^{-23})$$

thereby having a range of $$2^{-126} \leq x \leq (2-2^{-23})2^{127}$$

and characterized by an eight bit biased exponent $1 \leq E \leq 254$. In this case, the significand begins with an implicit leading 1 bit followed by 23 expressly specified bits.

The normalized representation of an extended or file format of the present invention is described in the presently illustrated embodiment as a normalized number having a 15 bit biased exponent with a 64 bit significand characterized by explicit leading 1 bit. In other words, the file format is $x=(-1)^P 2^{E-16383}(S\ 2^{-63})$ where $1 \leq E \leq 32766$ and where $E = 2^{15} - 1$ is reserved for infinites, invalids and indefinites.

Plus and minus zero is characterized by a biased exponent and significand both having a zero value. Thus, in the file format, the plus or minus zero is characterized by the number having the smallest exponent e.g. zero, and zeroes for the significand or by a number having a corresponding zero flag tagged thereto.

Similarly, denormalized numbers in memory, which are clustered about zero, have a range given by $2^{-126}(2^{-23}) \leq x \leq 2^{-126}(1-2^{-23})$ in a single precision and $2^{-1022}\, 2^{-52} \leq x \leq 2^{-1022}(1-2^{-52})$ in double precision.

Denormalized numbers in memory are characterized in each case by a biased exponent equal to zero and interpreted as $x=(-1)^P(2^{-126})(S\ 2^{-23})$ in single precision and $x=(-1)^P(2^{-1022})(S\ 2^{-52})$ in double precision.

In the file or extended format of the present invention a denormalized number has the range $(2^{-63})\, 2^{-16382} \leq x \leq 2^{-16382}(1-2^{-63})$, is characterized by a leading zero bit in the significand and is interpreted as $x=(-1)^P 2^{-16382}(S\ 2^{-63})$ Plus and minus infinity as described in the presently illustrated embodiment is characterized by a number in the single or double precision memory format as having a binary exponent of all ones and zero significand. In the file format, plus and minus infinity is characterized by the most positive exponent representable and a significand, 1.000 . . . 0, with a corresponding invalid flag tagged to the number.

Finally, a NAN or a "not a number" is defined in the presently illustrated embodiment as having, in single or double precision, all ones in the exponent and a nonzero significand. In the file format, NAN similarly has the most positive exponent representable and any significand not equal to 1.000 . . . 0 and, as before, a corresponding invalid flag tagged to the number. In such a case, the use of an actual significand is left to the user. Thus, it is possible that the value of the significand can be used to initialize storage such that when the storage is utilized by the user, these large magnitude NANs will propagate through the arithmetic operations and indicate to the user that an error occurred and program logic incorrectly accessed a nonutilized area of storage. Similarly, a NAN generated by an arithmetic operation and numeric data such as zero divided by a zero may be used as a pointer by assignment of its significand to the offending portion of code. Many other uses as well can be devised for specially coding and employing significands in NANs.

In addition to the double and read normalized and denormalized, and special cases described above, the numeric processor of the present invention is capable of handling integer word (16 bits) integer short (32 bits) and integer long (64 bits) representations as well as 18 digit signed BCD integers.

II. General Introduction to the System Context of the Numeric Processor of the Present Invention The numerical floating point processor of the present invention (hereinafter "the processor" or "FPU") is a high performance processor fabricated in an integrated circuit package and with standard circuit technology incorporating many features not available in any present day floating point processor. The processor of the present embodiment is intended to be used in a multimaster system as the arithmetical unit in support of a coprocessing central processing unit (CPU). The processor thus becomes a software transparent extension of the CPU, thereby greatly improving system performance beyond that achievable through other alternatives. As described in a copending application entitled Apparatus and Method for Cooperative and Concurrent Coprocessing of Digital Information filed June 30, 1978, Ser. No. 921,082, now U.S. Pat. No. 4,270,167, issued May 26, 1981, the processor is a concurrent, co-processing unit with its corresponding CPU. While the processor is executing a floating point instruction, its corresponding CPU continues with the instruction stream, thereby achieving overlapped operation with the processor. Program throughput is thereby increased by operational interleaving of the processor and CPU instructions. Floating point instructions are decoded directly from the CPU's instruction stream. When the floating point instruction is decoded from the instruction queue of the FPU and CPU, the floating point unit will execute that instruction in parallel with the CPU which continues with the instruction stream. If the CPU encounters a second floating point instruction, it will "mark time" until the processor has finished the first floating point instruction.

The bifurcated nature of the processor can be appreciated if the operation of the processor in conjunction with its CPU is briefly described. The FPU gains access to the local bus by means of a single request grant pin. The processor tracks the instruction queue of its corresponding CPU by monitoring the status inputs and tracking the data in parallel with the CPU. When a floating point instruction is fetched from the instruction queue, CPU 20 will not execute it. In the case of a non-memory instruction, the CPU 20 ignores it totally and proceeds with its other operations. In the case of an instruction with a memory reference, CPU 20 will calculate the effective address using its addressing modes, and will perform a dummy read, that is, a normal read except that CPU 20 will not enter the data. Instead, FPU 22 of the present invention, will capture the address of the operand during the first clock cycle and the data during a subsequent clock cycle. After a floating point instruction has been fetched, the FPU 22 can start execution unless it requires more pieces of data. In this latter case, the FPU will request the bus by the request/grant handshake and fetch the rest of the operand as though it were the central processor, CPU 20, itself, by incrementing the address captured from the bus to address the subsequent words of the operand. When FPU 22 needs to store the results in memory, it will use the address captured during the dummy read by CPU 20 to indicate the starting address of the operand in memory. Again, it will request the buses and will write into memory, incrementing the address after every write. While FPU 22 is computing internally, CPU 20 has the buses and can proceed with whatever the program dictates. This is what is meant by co-processing between FPU 22 and CPU 20.

Occasionally, synchronization between CPU 20 and FPU 22 is required and CPU 20 must wait for FPU 22 to finish before a subsequent floating point instruction can be executed. A specific software instruction, WAIT, is provided in the instruction set to cause CPU 20 to wait at the appropriate times. Similarly, when FPU 22 desires to store information in memory, it must make certain that it stored the information before CPU 20 tried to read it. Again, the synchronization is provided by a software instruction which will cause CPU 20 to wait if FPU 22 has not yet performed the required operation.

Figure 2:
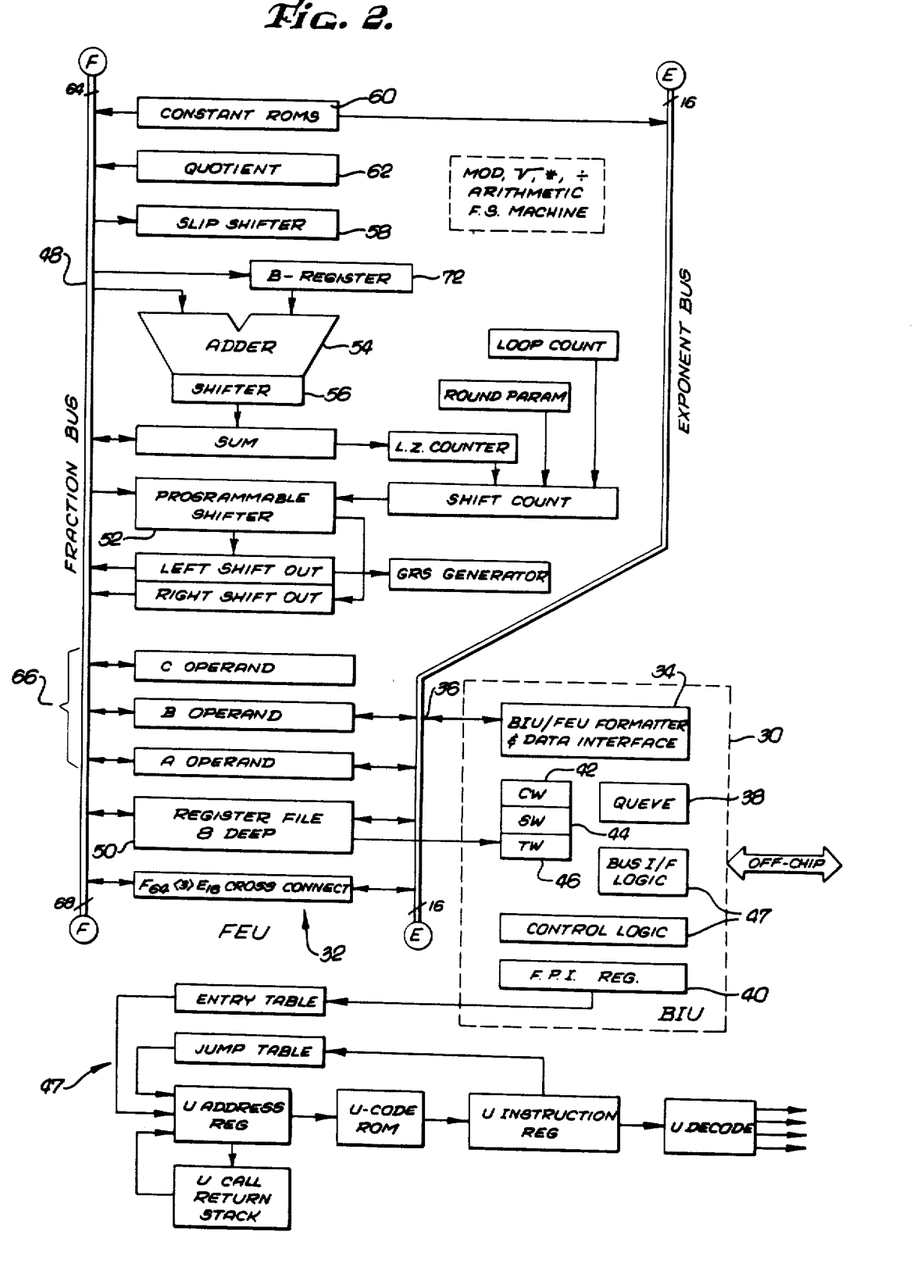
FIG. 2 is a simplified block diagram of the architecture of the numeric processor showing its division into a bus interface unit and floating point execution unit.

To accomplish this coprocessing FPU has a bus interface unit (BIU 30) shown in FIG. 2 which monitors and tracks the activities on the local bus and the status of CPU 20, and communicates with CPU 20, while the arithmetic operations are independently proceeding with the numerical processor's computation unit, floating point execution unit (FEU 32).

Figure 1:
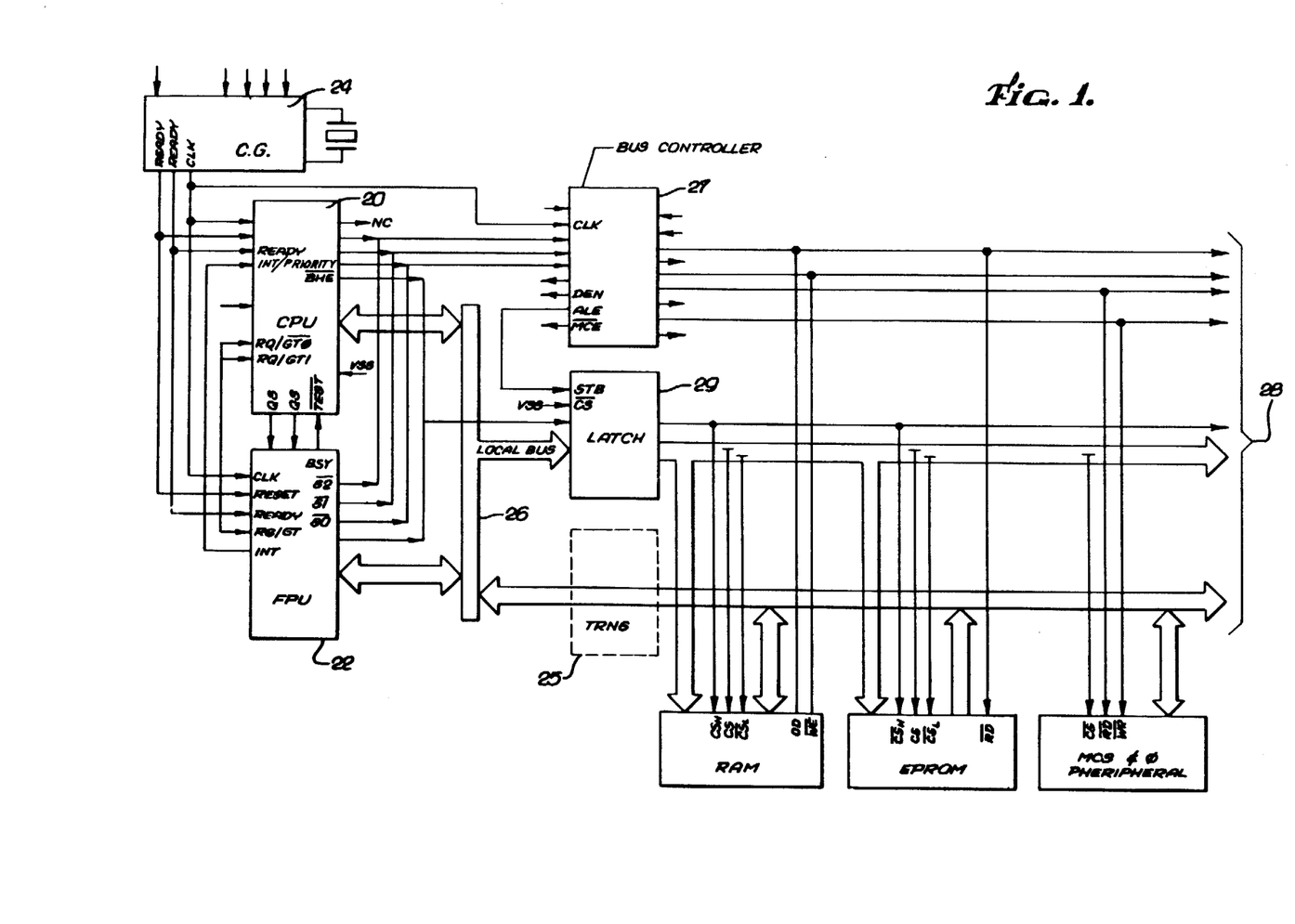
FIG. 1 is a block diagram schematically showing the system and environment in which the numeric processor of the present invention is used, namely in conjunction with a central processing unit having access to external peripherals and memory.

FIG. 1 diagramatically shows in simplified form a CPU 20 concurrently coprocessing information in a digital system with the processor of the present invention, floating point unit (FPU) 22. As diagramatically illustrated in FIG. 1, FPU 22 shares many of the external status and administrative function control pins with CPU 20. For example, FPU 22 and CPU 20 both operate from clock 24 and are coupled through a local bus 26 to a system bus 28 by the same set of latches 29, bus controllers 27 and transceivers 25. It is beyond the scope of the present invention to detail the exact nature and coordination within the local bus between CPU 20 and FPU 22, but details of this operation have been disclosed on copending applications entitled "Apparatus and Method For Cooperative and Concurrent Coprocessing of Digital Information," filed June 30, 1978, Ser. No. 921,082, now U.S. Pat. No. 4,270,167, issued May 26, 1981; and "System Bus Arbitration and Circuitry and Methodology," filed June 30, 1978, Ser. No. 921,083, now U.S. Pat. No. 4,257,095, issued Mar. 17, 1981.

The increased capability and reliability of FPU 22, becomes apparent when considered in view of the system of FIG. 1 wherein the FPU is a concurrent and coprocessing unit. The number of exceptions, interrupts and software handling which are reduced and removed from the arithmetic operations of FPU 22 necessarily leaves the CPU 20 and the entire system free to productively proceed with processing of instructions without being overburdened by or delayed by inadequate or faulty arithmetic execution.

FIG. 2 illustrates in simplified diagramatic form the basic internal architecture of FPU 22. FPU 22 includes a bus interface unit (BIU) 20 and FEU 32 are interactive and operate in a substantially independent, albeit coordinate fashion. This bifurcated internal architecture FPU 22 allows BIU to continuously track the local system bus status while execution of a floating point instruction is concurrently in progress within FEU 32.

The function of BIU 30 is to track the local system bus, to decode floating point instruction, maintain status information and control the local bus when FPU 22 is transferring data. The bus handshake protocol between BIU 30 and CPU 20 as described in copending applications entitled "Apparatus and Method For Cooperative and Concurrent Coprocessing of Digital Information," filed June 30, 1978, Ser. No. 921,082, now U.S. Pat. No. 4,270,167, issued May 26, 1981; and "System Bus Arbitration and Circuitry and Methodology," filed June 30, 1978, Ser. No. 921,083, now U.S. Pat. No. 4,257,095, issued Mar. 17, 1981. BIU/FEU formatter and data interface unit 34 serves to handle the passing of command, operands and status between BIU 30 and FEU 32.

CPU 20 and FPU 22 simultaneously maintain a queue of prefetched instructions. Therefore, FPU 22 will simultaneously decode a floating point instruction with CPU 20. Upon detection of a floating point instruction, FPU 22 will gain control of the system bus and perform any memory read or write cycles required. A 20 bit data port 36 couples to BIU 30 to local bus 26. Coupled to data pot 36 are a six byte instruction queue 38, a twenty bit floating point instruction address register 40, a sixteen bit control register (CW)42, a sixteen bit status register (SW)44, and a sixteen bit tag register (TW)46. Additional logic registers and decoding circuitry 47 are also included within BIU 30, in a manner well-known to the art and as disclosed in the above referenced copending applications, to decode and provide the necessary administrative processing of instructions into and from FPU 22 with respect to the local bus.

Floating point execution unit 32 is characterized by an internal file format, eighty bits wide, diagramatically shown in FIG. 2 as a 64 bit fraction bus 48 and a 16 exponent bus 49. All numerical quantities are converted to this standard file length real number within FEU 32, namely to a numeric quantity with a fifteen bit biased exponent, a signed bit and a 63 bit fraction. All calculations on the fractions within FEU 32 are performed to 67 bits of accuracy and then rounded as provided by precision control settings as discussed below.

Coupled to fraction bus 48 is a file memory array comprising a register file 50, eight registers deep, a programmable shifter 52, a sticky bit detector and adder 54, a post or sum shifter 56, a skip shifter 58, a quotient register 62, a multiplexed B register 64 and a constant ROM 60 containing various constants used in calculations of transcendental approximations. In addition, a number of temporary registers 66 are included as may be required in the mathematical operation and processing. Random control logic 68 is also included to provide discrete control in response to microcoded instructions in a manner well-known to the art. Logic circuit 68 includes a microcode engine for decoding the instructions and includes a microcode ROM to store the microcode program. The microcode program is not described herein for the sake of brevity, but can be derived from the definitions of the orthogonal instruction set described.

Figure 8A:
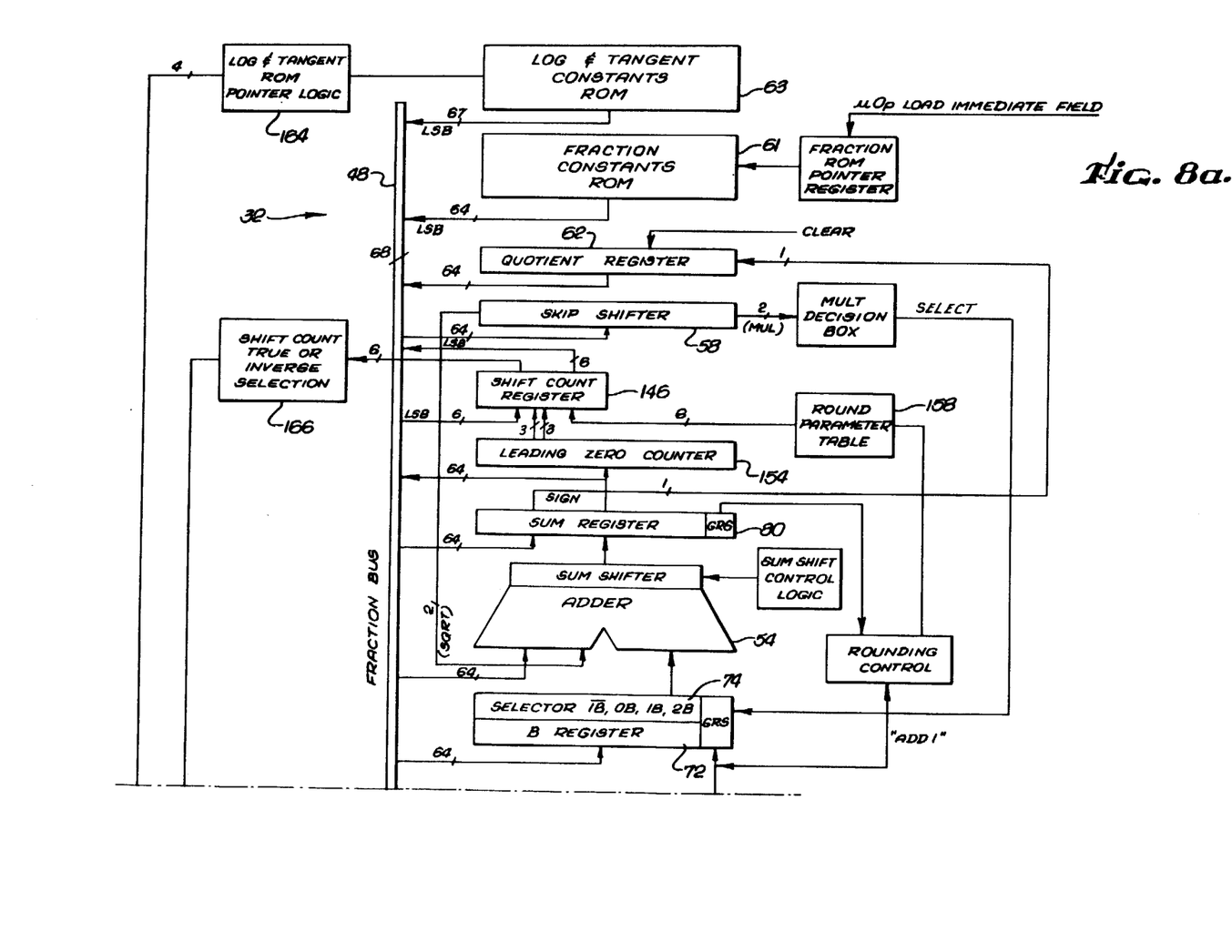
Figure 8B:
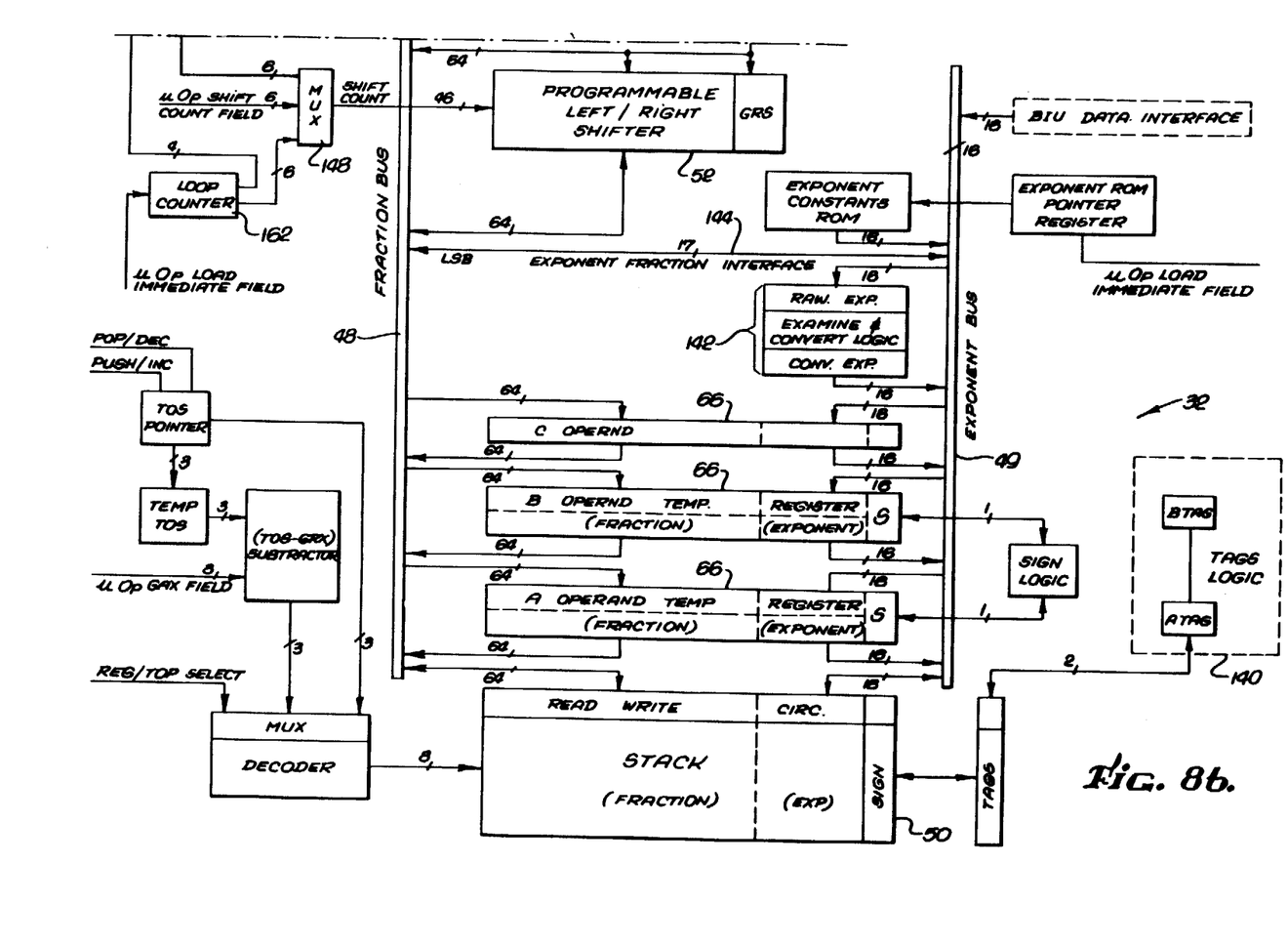

Consider the loading of numbers from memory into FEU 32 in greater detail as illustrated in FIGS. 8a and b. Data, for example, a 64 bit integer transferred by BIU 30 in 16 bit blocks is placed in one of the temporary registers 66 and then loaded into sum register 80. The next 16 bit block is placed in a temporary register 66, but is shifted left by 16 bits in shifter 52 before being loaded into sum register 80. The remaining two 16 bit blocks are similarly loaded and shifted until the 64 bit integer has been assembled in sum register 80, which is still left with 16 leading zeros. Normalization can now be implemented. Sum register 80 includes the following components. Eight 8-input nor gates included in sum register 80 have their inputs coupled to an internal sum register and have their outputs coupled to a first coding circuit which identifies how many of the bytes are all zero. If all eight bytes are all zero, a zero indicator is immediately activated. If 0–7 bytes are zero, the number of all zero bytes is loaded in to leading zero counter 154. Counter 154 in turn is coupled to shift output register 146 whose output is coupled to shift count true or reverse detection circuit 166. The output of multiplexer 148 is used to control the number of shifts in programmable shifter 52, thereby setting up of the contents of sum register 80 to be shifted left by the number of all zero bytes. Similarly, a second coding circuit has its inputs coupled to the eight bit places of the highest order byte of register 80. A three bit filed is similarly loaded into counter 154, register 146 and multiplexer 148 to shift the contents of register 80 left by the remaining number of zero bit places in the leading byte. The number of byte and bit shifts stored in counter 154 is then coupled to exponent circuit 154 wherein a corrected exponent is generated. The normalized number representing the integer is then stored in file 50.

Consider the normalization of a 32 bit real number in file format. The 32 bit word from BIU is characterized as consisting of word 1 comprising the 16 least significant bits and word 2 comprising the 16 most significant bits. The value, 40, is loaded from an immediate microcode literal according to microcode control. Table 158 is coupled to count register 146, with the result that the shifted value for word 1 is stored in register 80. Word 2 is then placed in a register ASE, which then includes from left to right, the sign, the exponent and the seven most significant bits. Again, from an immediate microcode literal a left shift of the contents of ASE by 57 places followed by a right shift of one and a forced one being placed into the most significant bit position. The contents of register ASE is then merged into register 80 by addition yielding a normalized real number, with an explicit leading 1 bit in 80 bit file format. This exponent of the memory real is coupled via exponent bus 49 to exponent circuit 152 where it is tested or examined for a special case exceptions, and converted to file format exponent. The normalized fraction and file format exponent are then loaded into file 50.

Without detailing the operation, 18 digit BCD is also translated into 80 bit file format using a series of multiplications by 10 (addition of a single and triple left shift) using Horner's rule as an implementary algorithm.

Conversion from file format to a selected data type is implemented as follows: In the case of an integer, the maximum number of the exponent representable in the data format is read from exponent ROM 160 into exponent circuit 142. The difference, (d = max exponent −exponent), between the exponent of the number to be converted and the maximum number is generated under microcode control and examined by circuit 152. If d is less than zero, an overflow condition results and an error flag is generated. If d is equal to zero an overflow is indicated if the number to be converted is positive (by our convention), or if negative, an overflow is generated unless the fraction is 1.000 . . . 0 (again this the largest negative number representable). Otherwise, the number is considered void. If d is greater than zero, then the fraction is shifted right by d places as a result of transfer of d from circuit 142, through line 144 to counter 146. The denormalized function is then rounded and ready to be sent out as an integer.

Conversion from file format real numbers to memory is similarly implemented by exponent examination in circuit 152 and rounding. The 64 bit number is register 80 is left shifted by a fixed number of places as determined by table 158. For example, a single precision number having a 23 bit significand is shifted 40 places left. A guard (G), round (R), and sticky (S) bit are calculated as described from the remaining tail in register 80. The original number to be converted is copied from file 50 and then shifted right by 23 bits with the GRS bits appended to the right end. The most significant 1 bit in file format is suppressed. The fraction can then be rounded and stored in a working register together with the converted exponent from circuit 152 for transfer through BIU 30 to the user in 16 bit segments.

In the case of BCD integers the file formatted number is divided by $10^{+18}$. If the quotient is less than one, then a quotient is denormalized by a number of bit places equal to the absolute value of the exponent of the quotient, and a loop is entered whereby each BCD digit is extracted by multiplying the quotient by ten and extracting the four most significant bits to form each BCD digit.

Operands received from and exterior memory are preformatted to a sixteen bit word boundary and transferred on a real time basis to FEU 32 through BIU/FEU interface 34. FEU 32 uses programmable shifter 52 to position the 16 bit quantities at adder 54 such that successive additions from the fraction and exponent and set tags which identify the type of operand. Control of FEU 32 is provided by a microcode control engine or control logic 68, which receives its instructions from the registers in the BIU/FEU interface unit 34.

Once FEU 32 has performed the operations required by the floating point instructions, it transfers the information regarding execution and/or error conditions to status register 44 and tag register 46 from whence they are relayed to the user. As previously stated, BIU/FEU unit 34 passes command, operands and status signals between BIU 30 and FEU 32.

Upon entry into FPU 22, each portion of an operand is transferred through BIU 30 into a performatter within the BIU/FEU interface unit 34, and then transferred to FEU 32. Once in FEU 32 the operand is checked for validity and repacked into the file format in which all operations are calculated. The preformatter in BIU/FEU unit 34 allows the repacking to be a succession of FEU unit additions such that the operand can be transferred using back-to-back memory cycles. One of the primary objects of BIU/FEU unit 34 is to allow the numeric processor to interface with both word and byte users which present information on both even and add memory addresses. Circuitry adapted to provide this type of service is described in the co-pending applications entitled, "Apparatus and Method for providing Byte and Word Compatible Information Transfer," Filed May 30, 1978, Ser. No. 910,103. A continuation application, Ser. No. 291,450 was filed Aug. 10, 1981, which application was allowed Nov. 3, 1982. In any case, information is uniformly provided to FEU 32 by unit 34 as two byte words.

Programmable Shifter

The operation of FEU 32 requires various unique circuits described below in detail.

Programmable shifter 52 of the present invention is included within FEU 32 to provide left or right shifts in the range of 0–63 bits in one clock cycle. Generally, this type of shifting is required in data format conversions, cordic approximations and denormalization operations. Left and right shifts are achieved by a bidirections byte shift matrix 90 and a bidirectional bit shift matrix 92 diagrammatically shown in FIG. 3. The number of shifts required is decoded into the number of whole bytes and fractional bits constituting the total required number of shifts.

Figure 3:
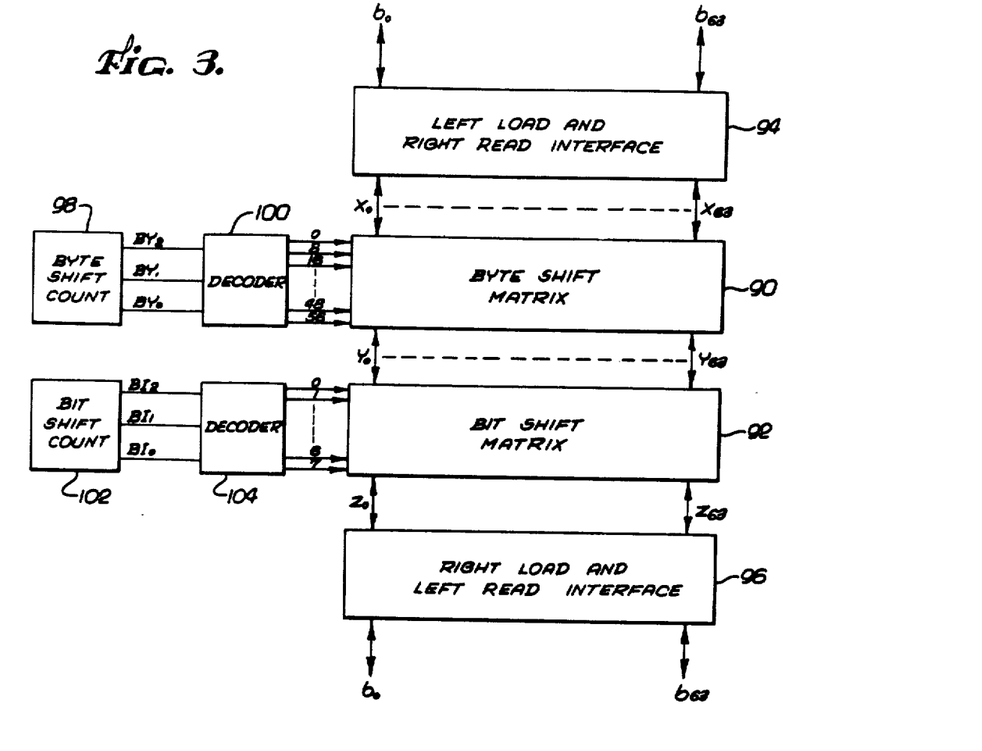
FIG. 3 is a block diagram of a programmable shifter included within the present invention wherein left and right shifts of an arbitrary length may be made within a single clock cycle.

For example, in FIG. 3 a shift of 52 bits would include 6 byte shifts and 4 additional bit shifts. The word is loaded from FEU bus 48 either into a left or right latch 94 or 96 respectively as required and then first shifted by the fractional number of bits or the required number of bytes, depending on whether the shift indicated is a left or right shift. For example, FIG. 3 shows a left load and right read interface circuit 94 which serves both as the input for left loads and the output for right shifts. Similarly, a right load and left read interface circuit 96 is provided as a right shift input circuit and a left shift output circuit. A byte shift count register 98 and decoder 100 drives byte shift matrix 90 while a similar bit shift count register 102 and decoder 104 drives the bit shift matrix 92. Both registers 98 and 102 are three bits wide and drive similar shift matrices 92 and 90. Byte shift register 98 is decoded by decoder 100 to drive byte shift command lines labeled 0, 8, 16, 32 .. . 48, and 56. Similarly, bit decoder 104 has as its output eight discrete lines labeled as 0, 1, 2, . . . 6, and 7.

Figure 4:
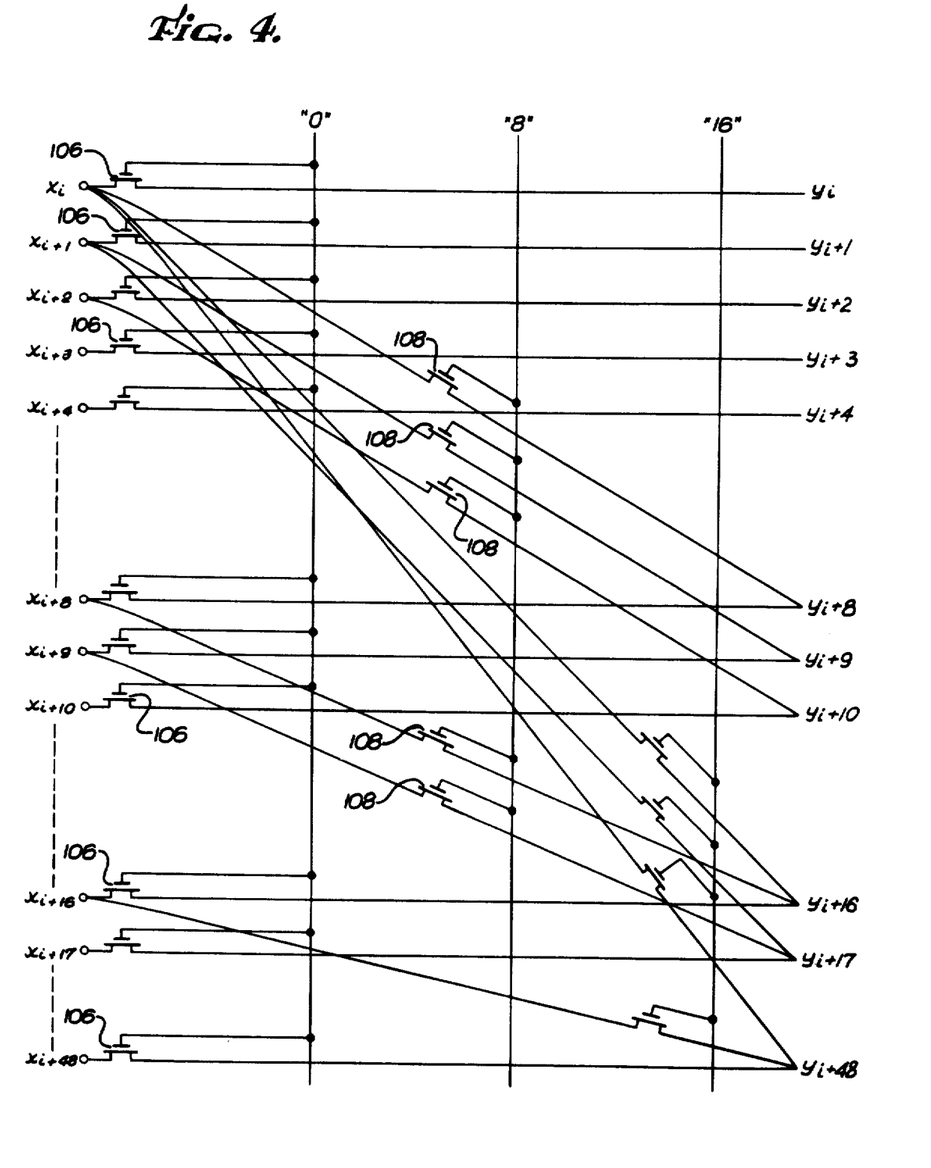
FIG. 4 illustrates the byte matrix shifter portion of the programmable shifter illustrated in FIG. 3.

FIG. 4 diagramatically illustrated byte shift matrix 90 and bit shift matrix 92. Only byte shift matrix 90 will be illustrated for clarity, but bit shift matrix 92 is analogously constituted. The devices illustrated are bidirectional integrated circuit devices, and for the sake of simplicity, the left hand nodes, $X_i$ shall be considered the input while the right hand nodes, $Y_i$ shall be considered the output, although the matrix is totally symmetrical and the opposite could also be true. In the illustrated example, activation of the "0" decode line from decoder 100 activates bidirectional devices 106 which allows the signal on nodes $X_i$ to be transferred directly across the nodes $Y_1$, *thereby representing a zero shift. However, if the decode line "8" is activated, bidirectional devices 108 are each activated, thereby coupling node $X_i$ to node $Y_i+8$.* Similarly, discrete decode line "16" will cause node $X_i$ to be coupled to node $Y_i+16$ and so forth.

In the same manner, discrete control lines 0, 1, 2 . . . from decoder 104 will cause shift devices similar to those shown in FIG. 4 to cross-couple node $X_i$ to node $Y_i+1$ in case of activation of control line "1" and $X_i$ to $X_i+2$ in the case of control line "2" and so forth.

Both byte and bit matrix are precharged and are considered in the present embodiment as being in an active low logic condition. Therefore, when a number is shifted to the left the vacated right bit positions will not be coupled to the data source. Thus, the precharged state of the byte or bit matrix will be read as logical zeros. Similarly, zeros will be filled in the most significant bit positions in a right stuff.

Figure 5:
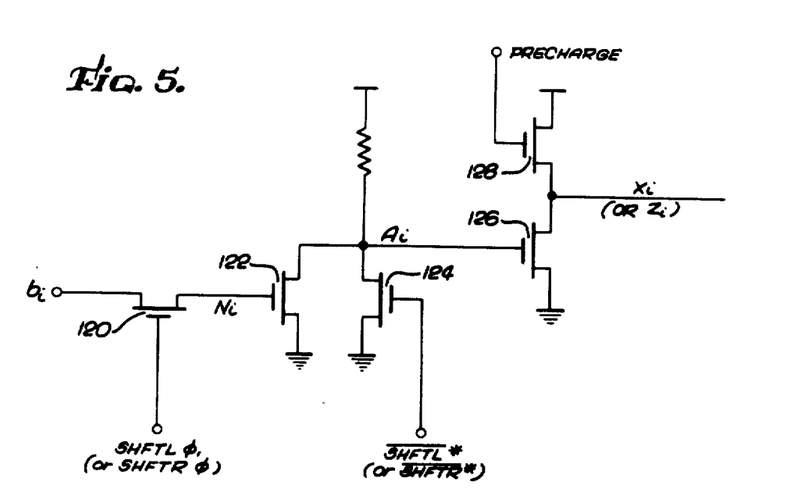
FIG. 5 is a schematic diagram of a load interface unit circuit used in the programmable shifter.

The read and load circuitry can be understood by considering in detail the circuitry of the bidirectional right and left read interfaces 94 and 96. FIG. 5 illustrates a typical unit circuit used as a load interface. A data bit, $b_i$, is coupled as an input to a bidirectional device 120 whose gate is controlled by the logical product of a left or right shift command signal and a timing clock, $\_{}_1$. If a shift is required, device 120 will go active on clock $\_{}_1$, charging node $N^i$, which is the gate of device 122, to either a logical zero or 1, depending upon whether the data bit, bi, is 1 or 0. At a slightly delayed time, the delayed right or left signal coupled to the gate of device 124 will go active low thereby allowing node $A_i$, to go high if node $N_i$ is 0 or will pull node $A_i$ if node $N_i$ is 1. The gate of transistor 126 is controlled by the condition of node $A_i$ and will, together with device 128, provided an inverted output $X_i$ with respect to $A_1$. In other words, $X_i$ will be pulled low in the case that $b_i$ is low or will be left precharged by device 128 if $b_i$ is one.

Figure 6:
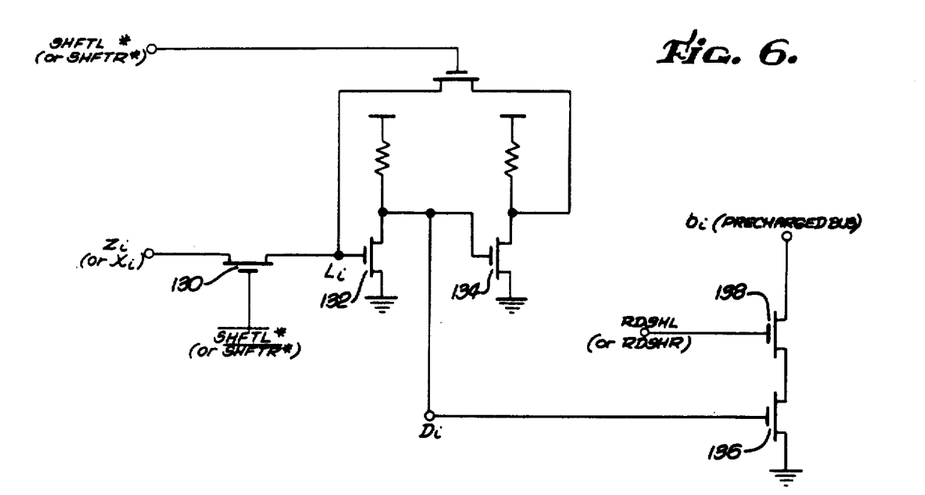
FIG. 6 is a schematic diagram of a read interface unit utilized by the programmable shifter.
Figure 7:
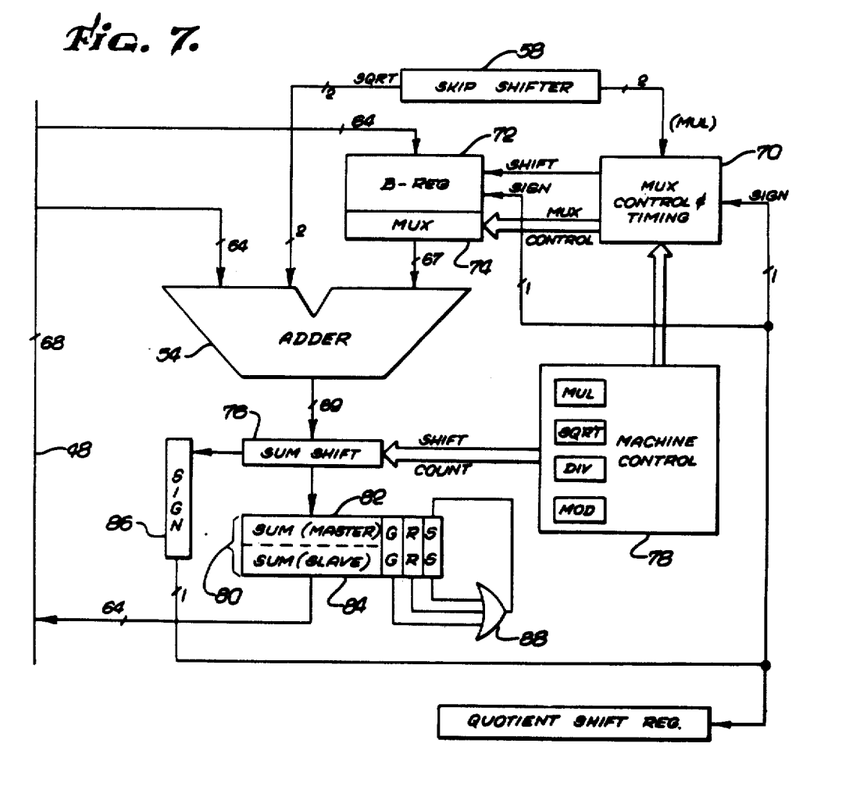
FIG. 7 is a simplified block diagram of the nanomachine portion of the floating point execution unit wherein multiplication, division, modulo reduction and square roots are implemented directly in hardware.

FIG. 6 similarly illustrates a typical unit read interface circuit. The input is $Z_i$ from bit or byte matrix 90 or 92 is coupled to the input of transistor 130 whose gate is controlled by a delayed shift left or shift right signal. The signal present at $Z_i$ is coupled to the input of inverter circuit 132 whose output is coupled to inverter circuit 134. The output of inverter circuit 134 in turn has its output fed back to the input of inverter 132 to form a feedback loop which is completed by the complement of the shift left or shift right signal through feedback device 130. The output of the first inverter stage 132 is coupled to the gate of device 136 which has an input coupled to ground and its output coupled to the bus node $b_i$. Device 136 is coupled to node $b_i$ through device 138 whose gate is controlled either by the read shift left or read shift right signal. Since the bus is precharged, the 1 on $Z_i$ is coupled as a 0 to the gate of device 136 which allows $b_i$ to remain in its precharged, logical high state. Otherwise, if $Z_i$ is 0 device 136 is conductive thereby pulling $b_i$ to ground as well. The output $Z_i$ is latched by the inverter combination of devices 132 and 134.

IV. Summary and Advantages of the Invention

Each of the above aspects of the invention, when taken together, result in significant improvements in integrated circuit numeric data processors. The numeric processor of the present invention is fast enough for many scientific and statistical calculations; accurate enough for business and commercial computations; precise enough for new applications like interval arithmetic; provides an unprecedented level of capability, safety and reliability with high performance and low cost. The numeric processor is primarily characterized by the fact that all data types, long and short real, long and short integer, compact BCD, and integer word are converted to an internal file or temporary real format of 80 bits in length. The internal stack within the numeric processor, the exponent and fraction buses, the arithmetic unit, and all shifters and registers are designed to operate with an 80 bit word, including three additional rounding bits (GRS) and where appropriate, a tag bit. The file format has an explicit leading bit in the significand and thus allows unnormalized as well as normalized arithmetic.

Various mathematical expressions, known for approximating functions, such as the polynomial approximation, Maclaurin series, successive divisions, and Padeh approximations, are examined with the purpose of determining how many elements in the series are required in order to obtain less than a specified degree of error, it is readily demonstrable that the only way in which the number of elements in the series can be kept within a reasonable bounds is to limit a domain of the argument in the approximation series. After the result is calculated, there must be some way in which the domain is then built back up to encompass the original domain of numbers which the numeric processor in designed to handle.

Cordic approximations are well-known to the art and the general approach is to reduce the argument to a very small remainder to a very small remainder using pseudo-divides, to create a series of pseudo-quotients. The approximate value of the function of the remainders are then computed followed by reconstruction of the function with the correct argument using pseudo-multiplications with the psuedo-quotients. The algorithm of the cordic approximation are well-known, somewhat complex and need not be repeated here. The exact point to which the argument need to be reduced will depend upon the accuracy desired, the mathematical approximation used and the function to be calculated. Microcode control applied (according to ordinary design considerations) is used to implement these argument reductions and approximation calculations. The pseudo-divisions and pseudo-multiplications are implemented as loops using additions and substractions employing mathematical constants from ROM 63 and the operand or remainder function. Shifts are required in the cordic algorithm which are controlled by the loop count. Loop counter 162 is provided for this purpose and is coupled both to multiplexer 148 and to ROM pointer logic 164 which in turn controls the read out from ROM 63. Essential to the hardware implementation of the cordic approximations is a flexible loading into a programmable shifter from multiple sources. For example, shifter 52 can be variably controlled through multiplexer 148; by loop counter 162, which is loaded from a microcode immediate field as well as the variable loop count; by bit or byte portion of leading sero counter 154; from any source coupled to fraction bus 48 through shift count register 126; from rounding parameter table 158 through register 126; and by both the shift count from counter 126 or its complement as may be required and as is selectively provided by shift count selection circuit 166. Without this combination of elements, cordic approximations could not be implemented in an integrated circuit chip of practical size or at sufficient speed and accuracy.

We claim:

1. A programmable bidirectional shifter for shifting a plurality of bits a plurality of bit positions during a single clock cycle comprising:

a selectively activated left load and right read interface circuit means for the loading of bits, which have been input and are to be shifted left and the reading of bits which have been shifted right which are to be output;

a byte shift matrix coupled to said left load and right read interface circuit means for performing a plurality of byte length shifts;

a bit shift matrix coupled to said byte shift matrix, for performing a plurality of bit length shifts;

a selectively activated right load and left read interface circuit means coupled to said bit shift matrix for the loading of bits which have been input and are to be shifted right and the reading of bits which have been shifted left and which are to be output;

a byte shift control circuit means coupled to said byte shift matrix to control the number of left and right byte shifts, said number of shifts being determined by the number of bit portions to be shifted and the number of bits per byte;

a bit shift control circuit means coupled to said bit shift matrix to control the number of left and right bit shifts, said number of shifts being determined by the number of bit positions to be shifted and the number of bits per byte;

whereby a left or right shift may be performed by said shifter for a plurality of bits a plurality of bit positions during a single clock cycle.

* * * * *

UNITED STATES PATENT AND TRADEMARK OFFICE
CERTIFICATE OF CORRECTION

PATENT NO. : 4,509,144                        Page 1 of 2

DATED : Apr. 2, 1985

INVENTOR(S) : Palmer et al.

It is certified that error appears in the above-identified patent and that said Letters Patent is hereby corrected as shown below:

| COLUMN | LINE | DESCRIPTION |
|---|---|---|
| 1 | 28 | Between the words "either or" please insert --detect--. |
| 2 | 62 | After the word "number" please insert --is--. |
| 2 | 62 | Please delete "$(2-3^{-52})$" and insert --$(2-2^{-52})$--. |
| 5 | 63 | Please delete "(BIU) 20" and insert --(BIU) 30--. |
| 5 | 64 | Please delete "coor-". |
| 5 | 65 | Please delete "dinate" and insert --coordinated-- |
| 6 | 23 | Please delete "pot" and insert --port--. |
| 6 | 35 | After the number "16" please insert --bit--. |
| 7 | 12 | Please delete "output" and insert --count--. |
| 8 | 7 | Please delete "is" and insert --in--. |

UNITED STATES PATENT AND TRADEMARK OFFICE
CERTIFICATE OF CORRECTION

PATENT NO. : 4,509,144

DATED : Apr. 2, 1985

INVENTOR(S) : Palmer et al.

Page 2 of 2

It is certified that error appears in the above-identified patent and that said Letters Patent is hereby corrected as shown below:

| COLUMN | LINE | DESCRIPTION |
|---|---|---|
| 8 | 12 | After the word "described" please insert --below--. |
| 8 | 29 | Please delete "and" and insert --an--. |
| 10 | 9 | After the word "$A_i$", second reference, please insert --low--. |
| 10 | 12 | Please delete "provided" and insert --provide--. |
| 11 | 4 | Please delete "in" and insert --is--. |
| 11 | 23 | Please delete "substractions" and insert --subtractions--. |

Signed and Sealed this

Twenty-ninth Day of April 1986

[SEAL]

Attest:

DONALD J. QUIGG

Attesting Officer

Commissioner of Patents and Trademarks